United States Patent
Yue et al.

(10) Patent No.: US 12,170,371 B2
(45) Date of Patent: Dec. 17, 2024

(54) LITHIUM IRON PHOSPHATE, PREPARATION METHOD THEREFOR, AND LITHIUM-ION BATTERY

(71) Applicant: LBM NEW ENERGY (AP) PTE. LTD., Singapore (SG)

(72) Inventors: Haifeng Yue, Tianjin (CN); Huan Guo, Tianjin (CN); Chen Yang, Tianjin (CN); Xiaobing Xi, Tianjin (CN); Caide Yang, Tianjin (CN); Youyuan Huang, Tianjin (CN); Xueqin He, Tianjin (CN)

(73) Assignee: LBM NEW ENERGY (AP) PTE. LTD., Singapore (SG)

( * ) Notice: Subject to any disclaimer, the term of this patent is extended or adjusted under 35 U.S.C. 154(b) by 0 days.

(21) Appl. No.: 17/996,766

(22) PCT Filed: Feb. 8, 2022

(86) PCT No.: PCT/CN2022/075496
§ 371 (c)(1),
(2) Date: Oct. 20, 2022

(87) PCT Pub. No.: WO2022/171074
PCT Pub. Date: Aug. 18, 2022

(65) Prior Publication Data
US 2023/0170481 A1 Jun. 1, 2023

(30) Foreign Application Priority Data
Feb. 9, 2021 (CN) .......................... 202110178973.4

(51) Int. Cl.
*H01M 4/58* (2010.01)
*C01B 25/45* (2006.01)
(Continued)

(52) U.S. Cl.
CPC .......... *H01M 4/5825* (2013.01); *C01B 25/45* (2013.01); *H01M 10/0525* (2013.01);
(Continued)

(58) Field of Classification Search
CPC .......... H01M 4/5825; H01M 10/0525; H01M 2004/021; H01M 2004/028; C01B 25/45;
(Continued)

(56) References Cited

U.S. PATENT DOCUMENTS

2009/0035204 A1* 2/2009 Xu .......................... C01B 25/45
423/311

FOREIGN PATENT DOCUMENTS

CN 1431147 A 7/2003
CN 102275889 A * 12/2011
(Continued)

OTHER PUBLICATIONS

Machine Translation of CN116936767 (Feb. 28, 2024) (Year: 2024).*
(Continued)

*Primary Examiner* — Matthew J Merkling
(74) *Attorney, Agent, or Firm* — Merchant & Gould P.C.

(57) ABSTRACT

The present application relates to lithium iron phosphate, a preparation method therefor, and a lithium-ion battery. The preparation method includes: sintering dry materials of an iron source, a lithium source, a phosphorus source, and a reductive carbon source to obtain lithium iron phosphate, wherein the sintering atmosphere includes a mild oxidizing gas, the mild oxidizing gas includes carbon dioxide, and the sintering temperature is 800-900° C.

10 Claims, 2 Drawing Sheets

(51) Int. Cl.
*H01M 4/02* (2006.01)
*H01M 10/0525* (2010.01)

(52) U.S. Cl.
CPC ...... *C01P 2002/72* (2013.01); *C01P 2004/61* (2013.01); *C01P 2004/62* (2013.01); *C01P 2006/10* (2013.01); *C01P 2006/12* (2013.01); *C01P 2006/40* (2013.01); *H01M 2004/021* (2013.01); *H01M 2004/028* (2013.01)

(58) Field of Classification Search
CPC .............. C01P 2002/72; C01P 2004/61; C01P 2004/62; C01P 2006/10; C01P 2006/12; C01P 2006/40
See application file for complete search history.

(56) References Cited

FOREIGN PATENT DOCUMENTS

| CN | 102569738 A | | 7/2012 |
|---|---|---|---|
| CN | 102790215 A | * | 11/2012 |
| CN | 102849716 A | | 1/2013 |
| CN | 103441269 A | | 12/2013 |
| CN | 105047921 A | * | 11/2015 |
| CN | 107565132 A | | 1/2018 |
| CN | 109867268 A | | 6/2019 |
| CN | 111799522 A | | 10/2020 |
| CN | 116936767 A | * | 10/2023 |

OTHER PUBLICATIONS

Machine Translation of CN 105047921A (Feb. 28, 2024) (Year: 2024).*
Machine Translation of CN-102275889-A (Feb. 28, 2024) (Year: 2024).*
Machine Translation of CN 102790215 A (Feb. 28, 2024) (Year: 2024).*
International Search Report for PCT/CN2022/075496 (May 5, 2022).
Japanese Office Action received for JP Application No. 2022-562905 on Oct. 20, 2023, 8 pgs.
Cui, et al., "An Environmental-Friendly Synthesis of LiFePO4 using Fe—P waste slag and greenhouse gas CO2", Jun. 13, 2016, 21 pgs.

* cited by examiner

LITHIUM IRON PHOSPHATE, PREPARATION METHOD THEREFOR, AND LITHIUM-ION BATTERY

CROSS-REFERENCE TO RELATED APPLICATIONS

The application is a National Stage Application of PCT/CN2022/075496, filed Feb. 8, 2022, which claims benefit of priority to Application No. 202110178973.4 filed with the Chinese Patent Office on Feb. 9, 2021, which applications are incorporated herein by reference. To the extent appropriate, a claim of priority is made to each of the above disclosed applications

TECHNICAL FIELD

The present application relates to the technical field of lithium-ion batteries, and particularly, to lithium iron phosphate, a preparation method therefor, and a lithium-ion battery.

BACKGROUND ART

Lithium iron phosphate has attracted extensive attention since it was proposed in 1997. Lithium iron phosphate, because of its characteristics including excellent stability, high rate charging, non-toxicity and long cycle life, takes its place among positive electrode materials of lithium-ion batteries. However, lithium iron phosphate still has significant defects such as low conductivity and ionic diffusivity.

Positive electrode materials with low conductivity greatly limits the performance of lithium iron phosphate batteries. Methods commonly used for improving the conductivity of lithium iron phosphate, such as carbon coating, metal doping, and addition of metal particles, improve the conductivity by several orders of magnitude. Conventional lithium iron phosphate is prepared by carbothermic reduction. In the carbothermic reduction of lithium iron phosphate, $Fe^{2+}$ is easily oxidized to $Fe^{3+}$, and thus a reducing agent needs to be added to prevent the oxidation of $Fe^{2+}$. In the production process of lithium iron phosphate, $H_2$ or carbon source is usually used as a reducing agent. The addition of carbon source causes formation of a carbon coating on the surface of lithium iron phosphate to enhance the conductivity of the particles. However, carbon coating may lead to reduction in compaction performance of the positive electrode materials, which thus results in degradation of electrochemical performance.

Studies have shown that crystallinity of lithium iron phosphate can be improved by raising a reaction temperature, and the compaction performance is thereby enhanced. However, since the carbothermic reduction process of lithium iron phosphate mainly involves the stepwise reduction process of $Fe^{3+}$—$LiFePO_4$—$Fe_xP$ (x=1, 2, 3) and $Fe_xP$ here is a ferromagnetic substance at room temperature, which may cause short-circuit and self-discharge of lithium-ion batteries, the intermediate product $LiFePO_4$ is an ideal state. Studies have shown that adding an excess amount of reducing agent or raising the reaction temperature during the reaction process leads to delithiation behavior of lithium iron phosphate and promotes the generation of $Fe_xP$. Therefore, excessively high reaction temperature cannot be applied in the carbothermic reduction of lithium iron phosphate. The reaction temperature in the prior art is below 800° C. at which a small amount of $Fe_xP$ is still produced.

It can be seen that a high temperature is advantageous to improve the crystallinity of lithium iron phosphate, enhance the compaction performance, and thus improve its electrochemical and physicochemical properties, but a larger amount of magnetic substance may be generated, which increases additional demagnetization cost and reduces production efficiency. Therefore, in the carbothermic reduction reaction of lithium iron phosphate, a method that can not only improve the crystallinity but also avoid the generation of the ferromagnetic substance is in urgent demand.

SUMMARY

In order to overcome the defect described above, the present application provides a lithium iron phosphate material, a preparation method therefor, and a lithium-ion battery, which can improve physicochemical and electrochemical properties of the lithium iron phosphate/carbon by suppressing the generation of $Fe_xP$ (x=1, 2, 3) in the carbothermic reduction process.

In a first aspect, an embodiment of the present application provides a preparation method of lithium iron phosphate, including a following step:
  sintering a dry material containing an iron source, a lithium source, a phosphorus source, and a reducing carbon source to obtain lithium iron phosphate, wherein
  the sintering atmosphere includes a mild oxidizing gas, the mild oxidizing gas includes carbon dioxide, and the sintering temperature is 800° C. to 900° C.

In the above solution, during the carbothermic reduction of lithium iron phosphate, the gas in the sintering atmosphere contains a mild oxidizing gas, which inhibits generation of a magnetic substance; a reduction tendency decreased by the addition of carbon dioxide to the system can be compensated by raising the temperature; and the elevated temperature can provide LFP/C with better crystallinity and thus greatly improved compaction performance. The method of the present application can ensure purity, crystallinity, and electrochemical properties of lithium iron phosphate.

On the basis of the first aspect, the mild oxidizing gas further includes a protective gas including at least one of nitrogen, argon, helium, and neon.

On the basis of the first aspect, the mild oxidizing gas further includes a protective gas, and a volume ratio of the carbon dioxide to the protective gas is (1:99) to (99:1).

On the basis of the first aspect, a total gas flow rate in the sintering atmosphere is 3 L/min to 10 L/min.

On the basis of the first aspect, a temperature holding time for the sintering is 2 h to 20 h.

On the basis of the first aspect, the method includes at least one of the following technical features a to d:
  a. the iron source includes at least one of ferric phosphate, metallic iron, ferric nitrate, ferric oxide, ferric chloride, and ferrous oxalate;
  b. the phosphorus source includes at least one of ferric phosphate, ammonium hydrogen phosphate, ammonium dihydrogen phosphate, ammonium phosphate, and ferrous hydrogen phosphate;
  c. the reducing carbon source includes at least one of sucrose, glucose, and polyethylene glycol; and
  d. the lithium source is at least one of lithium carbonate, lithium phosphate, lithium hydroxide, and lithium chloride.

On the basis of the first aspect, a mass ratio of the iron source, the lithium source, the phosphorus source, and the carbon source is (95-105):(90-110):(95-105):(0.1-10).

On the basis of the first aspect, a preparation process of the dry material includes:

mixing the phosphorus source, the iron source, the lithium source, the reducing carbon source, and a solvent and milling the mixture to obtain a slurry, and drying the slurry to obtain a dry material.

On the basis of the first aspect, the method further includes at least one of the following technical features a to g:

a. a method of the mixing and milling includes any one of ball milling and sand milling;
b. a median diameter D50 of solid particles in the slurry is 0.1 μm to 3 μm;
c. the solvent includes at least one of water and ethylene glycol;
d. a solid content in the slurry is 5% to 80% of a total mass of the slurry;
e. a method of the drying includes any one of spray drying and evaporation drying;
f. the drying temperature is 50° C. to 500° C., and
g. the drying time is 0.1 h to 10 h.

In a second aspect, an embodiment of the present application provides a lithium iron phosphate material prepared by the preparation method of the first aspect.

The lithium iron phosphate material includes at least one of the following technical features a to d:

a. the lithium iron phosphate is in an olivine structure;
b. a compaction density of powder of the lithium iron phosphate material is 2.1 $g/cm^3$ to 3.3 $g/cm^3$;
c. the lithium iron phosphate material has an average particle size of 0.1 μm to 5 μm; and
d. the lithium iron phosphate has a specific surface area of 1 $m^2/g$ to 50 $m^2/g$.

In a third aspect, an embodiment of the present application provides a lithium-ion battery including lithium iron phosphate prepared by the preparation method of the first aspect or the lithium iron phosphate of any one of the second aspect.

Compared with the prior art, the technical solution has at least the following technical effects.

In the preparation method of the present application, carbon dioxide added during the sintering inhibits the generation of $Fe_xP$, thus improving capacity per unit mass of LFP/C and reliability of the battery. Since carbon dioxide gas has a weak oxidizing capacity at high temperatures and its oxidizing capacity is insufficient to oxidize ferrous ions into ferric ions. The reaction formula at high temperatures (800° C.~900° C.) is $Fe_xP+CO_2+Li_2CO_3+H_3PO_4 \rightarrow LiFePO_4+H_2O+CO$. Therefore, the generation of $Fe_xP$ (x=1, 2, 3) is effectively inhibited. A reduction tendency decreased by the addition of carbon dioxide to the system can be compensated by raising the temperature, and at the same time the elevated temperature can provide carbon-coated lithium iron phosphate (LFP/C) with better crystallinity and thus greatly improved compaction performance. The method of the present application can ensure purity, crystallinity, and electrochemical properties of $LiFePO_4$.

As for the lithium iron phosphate prepared by the present application, during the carbothermic reduction of lithium iron phosphate, the gas in the sintering atmosphere contains a mild oxidizing gas and the mild oxidizing gas is carbon dioxide. The lithium iron phosphate has higher purity and crystallinity, and good electrochemical property.

BRIEF DESCRIPTION OF DRAWINGS

The present application will be further described below with reference to the accompanying drawings and examples.

DETAILED DESCRIPTION OF THE EMBODIMENTS

In order to better understand the technical solutions of the present application, the embodiments of the present application are described in detail below with reference to the accompanying drawings.

It should be clear that the described embodiments are only a part of the embodiments of the present application, but not all of the embodiments. Based on the embodiments in the present application, all other embodiments obtained by those of ordinary skill in the art without creative work fall within the protection scope of the present application.

The terms used in the embodiments of the present application are only for describing specific embodiments, and are not intended to limit the present application. As used in the embodiments of the present application and the appended claims, the singular forms "a", "the", and "this" are intended to include the plural forms as well, unless the context clearly indicates otherwise.

It should be understood that the term "and/or" used herein is only an association relationship to describe the associated objects, indicating that there may be three relationships. For example, A and/or B may indicate three cases, that is, A alone, both A and B, and B alone. In addition, the character "/" herein generally indicates that the associated objects before and after it have an "or" relationship.

In the prior art, lithium iron phosphate, when used as the positive electrode material, has the advantages of high rate charging, long cycle life, and high stability. The conventional lithium iron phosphate is prepared by a traditional solid phase reduction system in which the reduction reaction can be accomplished only at a relatively low temperature (generally 700-750° C. in the prior art), and formation of $Fe_xP$ (x=1, 2, 3) impurities resulting from excessive reduction in the reaction process is not conducive to the electrochemical properties of carbon-coated lithium iron phosphate LFP/C.

Therefore, an embodiment of the present application provides a preparation method of lithium iron phosphate, including a step of:

sintering a dry material containing an iron source, a lithium source, a phosphorus source, and a reducing carbon source to obtain lithium iron phosphate, wherein the sintering atmosphere includes a mild oxidizing gas, the mild oxidizing gas includes carbon dioxide, and the sintering temperature is 800° C. to 900° C.

In the above solution, carbon dioxide added during the sintering in the present application can inhibit the generation of impurities $Fe_xP$ (x=1, 2, 3), thus improving capacity per unit mass of carbon-coated lithium iron phosphate LFP/C and reliability of the battery. Specifically, since carbon dioxide gas has a weak oxidizing capacity at high temperatures and its oxidizing capacity is insufficient to oxidize ferrous ions into ferric ions. The reaction formula at high temperatures (800° C.~900° C.) is $Fe_xP+CO_2+Li_2CO_3+H_3PO_4 \rightarrow LiFePO_4+H_2O+CO$. Therefore, the generation of $Fe_xP$ (x=1, 2, 3) is effectively inhibited. A reduction tendency decreased by the addition of carbon dioxide to the system can be compensated by raising the temperature, and at the same time the elevated temperature can provide LFP/C with better crystallinity and thus greatly improved compaction performance. The method of the present application can ensure purity, crystallinity, and electrochemical properties of lithium iron phosphate (LFP).

The sintering temperature is 800° C. to 900° C., and specifically, the sintering temperature may be 800° C., 810° C., 820° C., 830° C., 840° C., 850° C., 860° C., 870° C., 880° C., 890° C., 900° C., or the like, and is not specifically limited. The sintering temperature is not limited to the listed numerical values, and other unlisted numerical values within the numerical range are also applicable. When the temperature is lower than 800° C., the resulting lithium iron phosphate has poor crystallinity and powder compactability. The lithium iron phosphate prepared in the present application has high powder compactability, which helps achieve high energy density. Preferably, the sintering temperature is 820° C. to 880° C.

As an optional technical solution of the present application, the source of carbon dioxide is not limited. For example, carbon dioxide can be directly introduced, or carbon dioxide can be generated during the preparation process by using a substance capable of producing carbon dioxide.

The lithium iron phosphate obtained in the above embodiment has greatly improved electrochemical properties, cycle performance, safety, and crystallinity as compared with the conventional lithium iron phosphate obtained by carbothermic reduction under an inert gas.

As an optional technical solution of the present application, the mild oxidizing gas further includes a protective gas, and the protective gas is at least one of nitrogen, argon, helium, and neon. For example, the mild oxidizing gas may be a combination of nitrogen and carbon dioxide, a combination of argon and carbon dioxide, or the like. In the reaction process, carbon dioxide can inhibit the generation of $Fe_xP$, and the protective gas controls the chemical reaction between the reaction product and the environment. The volume ratio of carbon dioxide to the protective gas is (1:99) to (99:1). Specifically, the volume ratio of carbon dioxide to the protective gas may be 1:99, 10:90, 20:80, to 30:70, 40:60, 50:50, 60:40, 70:30, 80:20, 90:10, 99:1, or the like, and is not specifically limited. The volume ratio is not limited to the listed numerical values, and other unlisted numerical values within the numerical range are also applicable. Preferably, the volume ratio of carbon dioxide to the protective gas is (30-70):(70-30). The volume ratio of carbon dioxide to the protective gas in the above range can increase the reducing capacity of the system and improve carbonization rate of the carbon source, thereby accelerating the reduction reaction of $Fe^{3+}$ and allowing $Fe^{3+}$ to be fully reduced. Consequently, the uniformity of the crystal structure and the compaction density of the powder can be further improved. The sintering process of the present application is carried out in an atmosphere of carbon dioxide and the protective gas, which can not only improve the capacity per unit mass of the carbon-coated lithium iron phosphate LFP/C and reliability of the battery, but also facilitate adjustment of the redox tendency of the system. The addition of carbon source can have more selectivity and flexibility.

In an optional technical solution of the present application, the sintering is carried out in a HB-Ln2060 intermittent rotary resistance furnace, and a temperature increasing rate of the sintering is 1° C./min to 10° C./min. Specifically, the temperature increasing rate may be 1° C./min, 2° C./min, 3° C./min, 4° C./min, 5° C./min, 6° C./min, 7° C./min, 8° C./min, 9° C./min, 10° C./min, or the like, and is not specifically limited. The temperature increase rate is not limited to the listed numerical values, and other unlisted numerical values within the numerical range are also applicable. A temperature holding time of the sintering is 2 h to 20 h. Specifically, the temperature holding time may be 2 h, 4 h, 6 h, 7 h, 8 h, 9 h, 10 h, 11 h, 12 h, 13 h, 14 h, 16 h, 18 h, 20 h, or the like, and is not specifically limited. The temperature holding time is not limited to the listed numerical values, and other unlisted numerical values within the numerical range are also applicable. A total gas flow rate in the sintering atmosphere is 3 L/min to 10 L/min, specifically 4 L/min, 5 L/min, 6 L/min, 7 L/min, 8 L/min, 9 L/min, or the like, but is not limited to the listed numerical values, and other unlisted numerical values within the numerical range are also applicable. The flow rates of carbon dioxide and the protective gas in the sintering may be the same or different. Carbon dioxide and the protective gas exhibit different effects and do not affect each other. If the flow rates are too low, the protective atmosphere cannot play a protective role; and if the flow rates are too high, the gas would take the powder out of the rotary furnace, leading to clogging of a pipeline.

In an optional technical solution of the present application, the iron source of the present application includes at least one of ferric phosphate, metallic iron, ferric nitrate, ferric oxide, ferric chloride, and ferrous oxalate.

In an optional technical solution of the present application, the phosphorus source includes at least one of ferric phosphate, ammonium hydrogen phosphate, ammonium dihydrogen phosphate, ammonium phosphate, and ferrous hydrogen phosphate.

In an optional technical solution of the present application, the reducing carbon source is at least one of sucrose, glucose, and polyethylene glycol. Specifically, the reducing carbon source may be any one of sucrose, glucose, and polyethylene glycol, or may be a combination of polyethylene glycol and sucrose, a combination of polyethylene glycol and glucose, a combination of polyethylene glycol with sucrose and glucose, or the like.

In an optional technical solution of the present application, the lithium source is at least one of lithium carbonate, lithium phosphate, lithium hydroxide, and lithium chloride.

In an optional technical solution of the present application, a mass ratio/molar ratio of the iron source, lithium source, phosphorus source, and carbon source is (95-105):(90-110):(95-105):(0.1-10). For example, the mass ratio of the iron source, lithium source, phosphorus source, and carbon source may be 95:90:100:0.1, 100:100:105:5, 100:110:95:10, 105:90:95:0.1, 100:105:105:3, or the like and is not specifically limited. The mass ratio is not limited to the listed numerical values, and other unlisted numerical values within the numerical range are also applicable.

In an optional technical solution of the present application, preferably, both the phosphorus source and the iron source are ferric phosphate, and a mass ratio of ferric phosphate to the reducing carbon source is (1~100):1, specifically 100:1, 90:1, 80:1, 70:1, 65:1, 60:1, 50:1, 40:1, 30:1, 20:1, 10:1, 8:1, 5:1, 2.5:1, 2:1, 1.6:1, 1.25:1, or 1:1, and is not specifically limited. The mass ratio is not limited to the listed numerical values, and other unlisted numerical values within the numerical range are also applicable. If ferric phosphate and the reducing carbon source are controlled within the above range, the prepared material has good conductivity. An excess amount of carbon source added causes the coating to be too thick, thus increasing the internal resistance of the material and reducing the total amount of active substances. An insufficient amount of carbon source added causes uneven carbon coating and affects the conductivity of the material.

A molar ratio of the lithium element in the lithium source to ferric phosphate is (0.97~1.1):1. Specifically, the molar ratio of the lithium element in the lithium source to ferric phosphate may be 0.97:1, 0.98:1, 1.0:1, 1.05:1, 1.1:1, or the like and is not limited herein. The molar ratio is not limited to the listed numerical values, and other unlisted numerical values within the numerical range are also applicable.

In an optional technical solution, the preparation method of lithium iron phosphate includes following steps:

mixing and milling the phosphorus source, iron source, lithium source, reducing carbon source, and a solvent to obtain a slurry; drying the slurry at 50° C. to 500° C. for 0.1 h-10 h to obtain a dry material; sintering the resulting dry material at 800° C. to 900° C. for 2 h-20 h, in a sintering atmosphere containing a gas including carbon dioxide gas and the protective gas, to obtain lithium iron phosphate, in which the volume ratio of the carbon dioxide gas and the protective gas is (1:99) to (99:1), and the total gas flow rate is 3 L/min to 10 L/min.

In an optional technical solution, the method of mixing and milling includes ball milling or sand milling. Specifically, the ball milling operation is performed in an SX-8 type ball mill.

In an optional technical solution, the solvent includes at least one of water and ethylene glycol.

In an optional technical solution, the solid particles in the slurry has a median diameter D50 of 0.1 μm~3 μm. Specifically, the median diameter D50 of the solid particles in the slurry may be 0.12 μm, 0.14 μm, 0.15 μm, 0.18 μm, 0.2 μm, 0.22 μm, 0.25 μm, 0.28 μm, or the like, and is not limited herein. The median diameter D50 of the solid particles in the slurry is not limited to the listed values, and other unlisted values within the numerical range are also applicable. Specifically, the method for controlling the above-mentioned particle size includes performing ball milling on large particles in the slurry raw material to a D50 of 0.7-0.9 μm (to make a slurry with a solid content of 53%), performing ball milling on small particles to a D50 of 0.4-0.6 μm (to make a slurry with a solid content of 20%), then mixing the obtained slurries and performing fine grinding. The particle size D50 of the slurry finally obtained is 0.1 μm to 0.3 μm.

The solid content in the slurry is 5% to 80% of the total mass of the slurry. Specifically, the solid content in the slurry may be 5%, 10%, 20%, 30%, 40%, 50%, 60%, or the like of the total mass of the slurry and is not limited herein. The solid content in the slurry is not limited to the listed numerical values, and other unlisted numerical values within the numerical range are also applicable. Preferably, the solid content in the slurry is 10% to 60% of the total mass of the slurry.

The drying method is any one of spray drying and evaporation drying. Specifically, the spray drying uses a sprayer to carry out centrifugal spray drying. The inlet temperature of the sprayer is 110° C. to 300° C. Specifically, the inlet temperature may be 120° C., 130° C., 150° C., 180° C., 200° C., 230° C., 250° C., 280° C., 300° C., or the like. The outlet temperature of the sprayer is 60° C. to 130° C. Specifically, the outlet temperature may be 65° C., 70° C., 75° C., 80° C., 85° C., 90° C., 110° C., or the like. The centrifugal spray drying used in the present application is more advantageous than other spray methods. For example, the required droplets can be formed more stably through centrifugal spray than two-fluid spray. In a case of two-fluid spray, airflow disturbance may occur when the airflow rate is too high, which results in doughnut-shaped and hollow particles. If the two-fluid spray drying method is used, the prepared lithium iron phosphate material would have a low compaction density and reduced electrochemical properties.

In the above reactions, the reaction trend can be established by simulating the reaction system through preliminary thermodynamic and kinetic analysis. Here, the thermodynamic data including $\Delta h^0_{f\,s,\,298.15\,K}$ (standard enthalpy of formation), $S^0_{s,\,298.15K}$ (standard entropy) and $C_p$ (specific heat capacity at constant pressure) of the basic reactants and possible products can be obtained through literature search and thermodynamic characterization, and formation enthalpy, entropy and temperature expression are obtained therefrom to determine the $\Delta G$ (Gibbs free energy) of the reaction system. The reaction equilibrium constant $k_{eq}$ of each reaction scheme can be obtained through the transformation using Arrhenius formula, and the mathematical method analysis is carried out in the factsage software to obtain the distribution trend of reaction products under different temperatures and atmospheres. The test results below are referred. The thermodynamic data of reactants and possible products are listed in Table 1 (standard enthalpy of formation and standard entropy of reactants and products in the reduction reaction, where $CO_2$ and $H_2O$ are in gas phase, and the others are in solid phase) and Table 2 (The specific heat capacity-temperature relationship of reactants and products).

TABLE 1

| Reactants and products | $\Delta h^0_{f\,s,\,298.15\,K}$ (kJ/mol) | $S^0_{s,\,298.15\,K}$ [J/(K × mol)] |
|---|---|---|
| $LiFePO_4$ | −1591.23 | 136.75 |
| $Fe_2O_3$ | −824.2 | 87.332 |
| $P_2O_5$ | −1505.5 | 228.8648 |
| $Li_2CO_3$ | −1175.08 | 90.31 |
| Sucrose | −2226.1 | 392.4 |
| $CO_2$ | −393.509 | 213.79 |
| $H_2O$ | −241.818 | 188.84 |
| $Li_3PO_4$ | −2095 | 105 |
| $Fe_3P$ | −164.010 | 114.142 |
| $Fe_2P$ | −160.250 | 72.34 |

TABLE 2

| Reactants and products | Specific heat capacity-temperature relationship |
|---|---|
| $LiFePO_4$ | $C_p = 47 + 0.2361 \times t - 2.4 \times 10^5 \times t^{-2}$ (t < 300 K) <br> $C_p = 102.68 + 0.0957 \times t - 14 \times 10^5 \times t^{-2}$ (t > 300 K) |
| $Fe_2O_3$ | $C_p = 93.43834 + 108.3577 \times t - 50.86447 \times t^2 + 25.58683 \times t^3 - 1.611330 \times t^{-2}$ |
| $Li_2CO_3$ | $C_p = 68.33230 + 146.6390 \times t - 162.5730 \times t^2 + 248.0260 \times t^3 - 0.702297 \times t^{-2}$ (298 K < t < 683 K) <br> $C_p = -6.394740 + 261.4660 \times t - 102.0050 \times t^2 + 42.47230 \times t^3 - 0.168328$ (683 K < t < 993 K) |
| $CO_2$ | $C_p = 24.99735 + 55.18696 \times t - 3369137 \times t^2 + 7.948387 \times t^3 - 0.136638 \times t^{-2}$ |
| $H_2O$ | $C_p = 30.09200 + 6.832514 \times t + 6.793435 \times t^2 - 2.534480 \times t^3 + 0.082139 \times t^{-2}$ |
| $Li_3PO_4$ | $C_p = -5 \times 10^{-17} \times t^6 + 4 \times 10^{-13} \times t^5 - 1 \times 10^{-9} \times t^4 + 2 \times 10^{-6} \times t^3 - 0.0016 \times t^2 + 0.8954 \times t - 27.586$ |

TABLE 2-continued

| Reactants and products | Specific heat capacity-temperature relationship |
|---|---|
| $Fe_2P$ | $C_p = 76.73 + 17.046 \times 10^{-3} \times t - 6.054 \times 10^5 \times t^{-2}$ |
| $Fe_3P$ | $C_p = 117.11 + 13.067 \times 10^{-3} \times t - 17.78 \times 10^5 \times t^{-2}$ |

According to the calculation in Table 1 and Table 2, it can be concluded that the content of $Fe_xP$ in the resulting lithium iron phosphate material can be controlled within the selection range of the raw materials and parameters of the embodiments described above.

The present application simulates, through thermodynamics and kinetics, the trend of the reaction system, which is collated with the experimental solution, and establishes the optimal reaction temperature. Thermodynamic to and kinetic simulation can effectively reduce experimental workload and provide optimal reaction conditions to reduce production costs and time costs, as well as provide theoretical support for performance improvement at a deeper level.

For the lithium iron phosphate material prepared by the above method, a compaction density of powder of the lithium iron phosphate material is 2.1 g/cm³ to 3.3 g/cm³, for example, 2.1 g/cm³, 2.3 g/cm³, 2.5 g/cm³, 2.6 g/cm³, 2.8 g/cm³, 3.0 g/cm³, 3.2 g/cm³, or the like, but is not limited to the listed numerical values, and other unlisted numerical values within the numerical range are also applicable.

Lithium iron phosphate is in an olivine structure.

The average particle size of lithium iron phosphate is 0.1 μm to 5 μm. Specifically, the average particle size of lithium iron phosphate may be 0.1 μm, 0.5 μm, 1 μm, 2 μm, 3 μm, 4 μm, 5 μm, or the like, and is not limited herein. The average particle size of lithium iron phosphate is not limited to the listed numerical values, and other unlisted numerical values within the numerical range are also applicable.

The specific surface area of lithium iron phosphate is 1 m²/g to 50 m²/g. Specifically, the specific surface area of lithium iron phosphate may be 1 m²/g, 5 m²/g, 10 m²/g, 20 m²/g, 35 m²/g, 40 m²/g, or the like, and is not limited herein. The specific surface area of lithium iron phosphate is not limited to the listed values, and other unlisted values within the numerical range are also applicable.

The lithium iron phosphate material prepared in the present application is a high-temperature sintered lithium iron phosphate material, in which the content of $Fe_xP$ is controlled and the crystallinity, powder compaction density, and electrochemical properties of the lithium iron phosphate are improved.

The present application provides a lithium-ion battery. The lithium-ion battery includes a positive electrode sheet, a negative electrode sheet, and a separator disposed between the positive electrode sheet and the negative electrode sheet.

The positive electrode sheet includes a positive current collector and a positive active material layer, and the positive active material layer may include a positive active material, a conductive agent, and a binder. The positive active material is the lithium iron phosphate prepared by the above preparation method.

As the positive current collector, Al foil can be used, and other positive current collectors commonly used in the art can also be used.

The conductive agent of the positive electrode sheet may include at least one of conductive carbon black, lamellar graphite, graphene, or carbon nanotubes.

The binder in the positive electrode sheet may include at least one of polyvinylidene fluoride, vinylidene fluoride-hexafluoropropylene copolymer, styrene-acrylate copolymer, styrene-butadiene copolymer, polyamide, polyacrylonitrile, polyacrylate ester, polyacrylic acid, polyacrylate salt, sodium carboxymethyl cellulose, polyvinyl acetate, polyvinylpyrrolidone, polyvinyl ether, polymethylmethacrylate, polytetrafluoroethylene, or polyhexafluoropropylene.

The negative electrode sheet includes a current collector and a negative active material layer. The negative active material layer includes a negative active material, a conductive agent, and a binder.

The current collector of the negative electrode sheet may include at least one of copper foil, aluminum foil, nickel foil, or a fluorocarbon current collector.

The negative active material may include at least one of soft carbon, hard carbon, artificial graphite, natural graphite, amorphous carbon, silicon-oxygen compounds, silicon-carbon compounds, and lithium titanate.

The binder may include at least one of carboxymethyl cellulose (CMC), polyacrylic acid, polyvinylpyrrolidone, polyaniline, polyimide, polyamideimide, polysiloxane, polystyrene-butadiene rubber, epoxy resin, polyester resin, polyurethane resin, or polyfluorene.

The conductive agent may include at least one of conductive carbon black, Ketjen black, acetylene black, carbon nanotubes, VGCF (Vapor Grown Carbon Fiber), or graphene.

As an optional technical solution of the present application, the separator includes at least one of polyethylene, polypropylene, polyvinylidene fluoride, polyethylene terephthalate, polyimide, or aramid. For example, the polyethylene includes at least one selected from high density polyethylene, low density polyethylene, or ultra-high molecular weight polyethylene. Especially, polyethylene and polypropylene have a good effect on preventing short circuits and can improve the stability of the battery through a turn-off effect. In some embodiments, the separator has a thickness ranging from about 5 μm to 500 μm.

As an optional technical solution of the present application, the lithium-ion battery may further include an electrolyte. In some embodiments, the electrolyte includes, but is not limited to, at least two of dimethyl carbonate (DMC), ethyl methyl carbonate (EMC), diethyl carbonate (DEC), ethylene carbonate (EC), propylene carbonate (PC), and propyl propionate (PP). In addition, the electrolyte may additionally include at least one of vinylene carbonate (VC), fluoroethylene carbonate (FEC), or a dinitrile compound as an electrolyte additive. In some embodiments, the electrolyte further includes a lithium salt.

In the lithium-ion battery of the present application, the positive electrode sheet, the separator, and the negative electrode sheet are wound or stacked in sequence to form an electrode member, and then the electrode member is packed into, for example, an aluminum plastic film for packaging, followed by introduction of electrolyte, formation, and packaging to prepare the lithium-ion battery. Then, the performance test and cycle test for the prepared lithium-ion battery are carried out.

The present application changes the atmosphere of sintering during carbothermic reduction, such that the gas in the sintering atmosphere includes a mild oxidizing gas, which inhibits the generation of $Fe_xP$. A reduction tendency of the system decreased by the addition of carbon dioxide can be compensated by raising the temperature, and the elevated temperature can provide LFP/C with higher crystallinity and power compaction density. The method of the above embodiments can ensure purity, crystallinity, and electrochemical properties of $LiFePO_4$. Furthermore, changing the proportion of the mild oxidizing gas in the sintering atmosphere can easily adjust the redox tendency of the system, and thus the addition of carbon source can have more selectivity and flexibility.

The typical but non-limiting examples of the present application will be described below.

Example 1

A preparation method of lithium iron phosphate includes the following steps:
(1) 4000 g of ferric phosphate, 1000 g of lithium carbonate, 150 g of sucrose, 250 g of polyethylene glycol, and 15.5 L of deionized water were mixed to obtain a slurry;
(2) 0.525 L of the slurry was ball milled, large particles in the slurry were ball milled to a D50 of 0.8 μm (solid content of 53%) and small particles were ball milled to a D50 of 0.5 μm (solid content of 20%), and then they were mixed and finely grind to a D50 of 0.2 μm (solid content 40%);
(3) the slurry obtained in step (2) was transferred into a spray dryer, of which an inlet temperature was 240° C., an outlet temperature was 80° C., a gas flow rate was 14 m³/h, and a peristaltic pump's flow rate was 5 L/h, to obtain a spray material; and
(4) the obtained spray material was sintered in a rotary resistance furnace at 800° C. for 10 h, a total gas flow rate in the sintering atmosphere was adjusted to 5 L/min, a gas in the sintering atmosphere was composed of carbon dioxide and nitrogen in a volume ratio of 1:1, flow rates of carbon dioxide and nitrogen were respectively 2.5 L/min and 2.5 L/min, so as to obtain a lithium iron phosphate material.

Example 2

Figure 1:
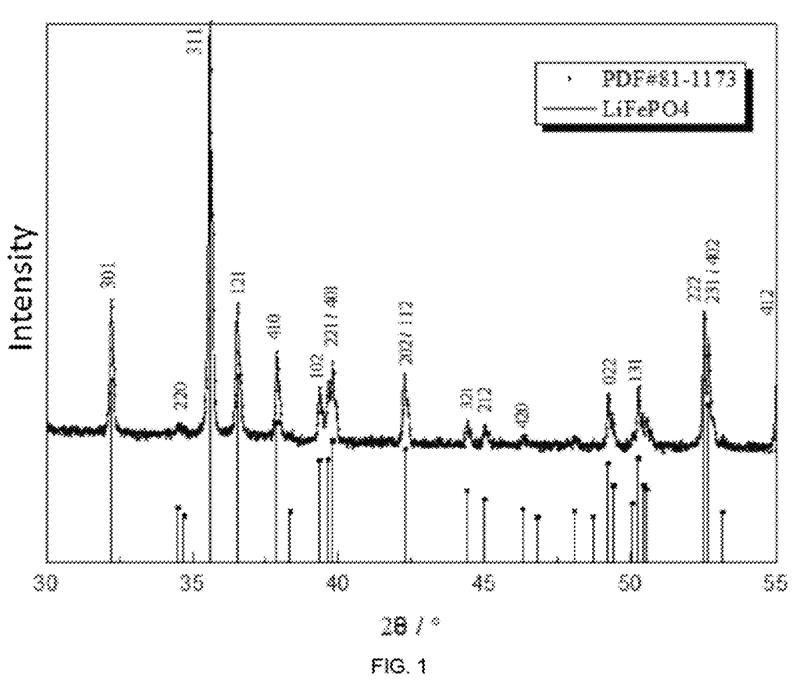
FIG. 1 is an XRD spectrum of the lithium iron phosphate material prepared in Example 2 of the present application.

A preparation method of lithium iron phosphate includes the following steps:
(1) 4000 g of ferric phosphate, 1000 g of lithium carbonate, 150 g of glucose, 250 g of polyethylene glycol, and 15.5 L of deionized water were mixed to obtain a slurry;
(2) 0.525 L of the slurry was ball milled, large particles in the slurry were ball milled to a D50 of 0.8 μm and small particles were ball milled to a D50 of 0.5 μm, and then they were mixed and finely grind to a D50 of 0.2 μm;
(3) the slurry obtained in step (2) was transferred into a Niro spray dryer for centrifugal spraying, of which an inlet temperature was 240° C., an outlet temperature was 80° C., a gas flow rate was 14 m³/h, and a peristaltic pump's flow rate was 5 L/h, to obtain a spray material; and
(4) the obtained spray material was sintered in a rotary resistance furnace at 850° C. for 10 h, a total gas flow rate in the sintering atmosphere was adjusted to 5 L/min, a gas in the sintering atmosphere was composed of carbon dioxide and nitrogen in a volume ratio of 1:1, flow rates of carbon dioxide and nitrogen were respectively 2.5 L/min and 2.5 L/min, and a lithium iron phosphate material was finally obtained FIG. 1 is an XRD spectrum of the lithium iron phosphate material prepared in this example. It can be seen from FIG. 1 that the lithium iron phosphate had good crystallinity, mainly because the content of $Fe_3P$ was controlled in the present application.

Example 3

The difference from Example 1 is that the volume ratio of carbon dioxide and nitrogen in step (4) was 1:9.

Example 4

The difference from Example 1 is that the volume ratio of carbon dioxide and nitrogen in step (4) was 9:1.

Example 5

The difference from Example 2 is that the volume ratio of carbon dioxide and nitrogen in step (4) was 1:9.

Example 6

The difference from Example 2 is that the volume ratio of carbon dioxide and nitrogen in step (4) was 9:1.

Example 7

The difference from Example 1 is that the flow rates of carbon dioxide and nitrogen were both 1 L/min.

Example 8

(1) 2120 g of ferric oxide, 3046 g of ammonium dihydrogen phosphate, 1000 g of lithium carbonate, 150 g of glucose, 250 g of polyethylene glycol, and 15.5 L of deionized water were mixed to obtain a slurry;
(2) 0.525 L of the slurry was ball milled, large particles in the slurry were ball milled to a D50 of 0.8 μm and small particles were ball milled to a D50 of 0.5 μm, and then they were mixed and finely grind to a D50 of 0.2 μm;
(3) the slurry obtained in step (2) was transferred into a Niro spray dryer for centrifugal spraying, of which an inlet temperature was 240° C., an outlet temperature was 80° C., a gas flow rate was 14 m³/h, and a peristaltic pump's flow rate was 5 L/h, to obtain a spray material; and
(4) the obtained spray material was sintered in a rotary resistance furnace at 850° C. for 10 h, a total gas flow rate in the sintering atmosphere was adjusted to 5 L/min, a gas in the sintering atmosphere was composed of carbon dioxide and nitrogen in a volume ratio of 1:1, flow rates of carbon dioxide and nitrogen were respectively 2.5 L/min and 2.5 L/min, and a lithium iron phosphate material was obtained.

Comparative Example 1

The difference from Example 1 is that in step (4), the spray material was sintered in a rotary resistance furnace at a temperature of 750° C., which was kept for 10 h, the total gas flow rate in the sintering atmosphere was adjusted to 5 L/min, and the gas in the sintering atmosphere was composed of nitrogen, whereby a lithium iron phosphate material was obtained.

Comparative Example 2

The difference from Example 1 is that carbon dioxide was replaced with an equal amount of air in step (4).

Comparative Example 3

The difference from Example 2 is that in step (4), the spray material was sintered in a rotary furnace at a temperature of 850° C. for 10 h, the total gas flow rate in the sintering atmosphere was adjusted to 5 L/min, and the gas in the sintering atmosphere was nitrogen, whereby a lithium iron phosphate material was obtained.

Figure 2:
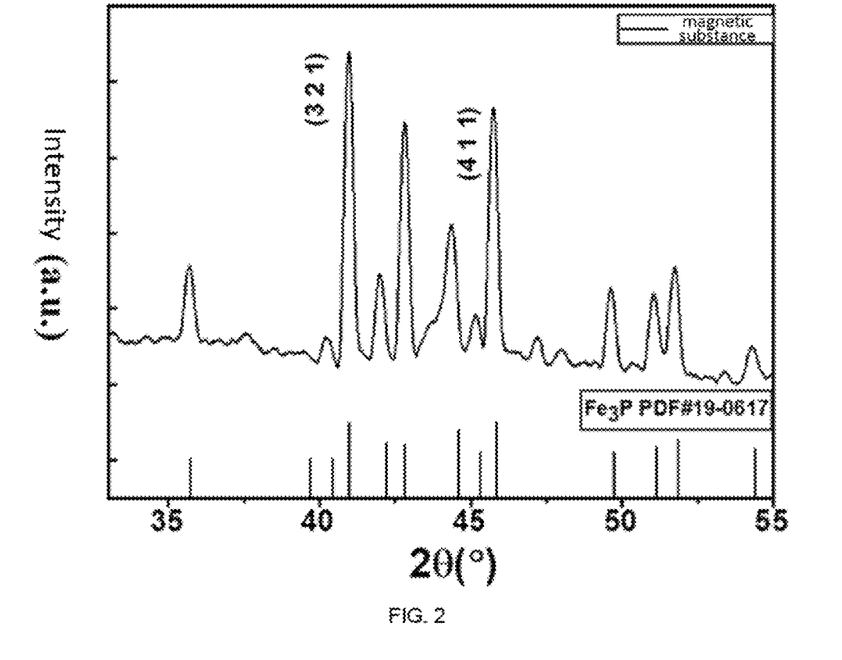
FIG. 2 is an XRD spectrum of the lithium iron phosphate material prepared in Comparative Example 3 of the present application.

FIG. 2 is an XRD spectrum of the lithium iron phosphate material obtained in Comparative Example 3. It can be seen that there are weak characteristic peaks of ferric phosphide, indicating that under the condition of only introducing nitrogen gas, in combination with the carbon source, a large amount of reducing gas is released to form a strong reducing atmosphere, which promotes the formation of iron phosphide in lithium iron phosphate, thereby causing harm to the safety of lithium iron phosphate.

Performance Test

The lithium iron phosphate materials obtained in the examples and comparative examples were subjected to the following performance tests.

(1) Physical property index test: the lithium iron phosphate materials obtained in the examples and comparative examples were each subjected to the tests of powder compaction density (using GB/T 24533-2009), XRD, and ICP (using GB/T 24533-2019).

(2) Electrochemical property test: the lithium iron phosphate materials obtained in the examples and the comparative examples were each used as a positive active material, and mixed with a conductive carbon black and polyvinylidene fluoride (PVDF) in a mass ratio of the positive active material:conductive carbon black:polyvinylidene fluoride (PVDF) of 90:5:5; each of the mixtures was mixed with N-methylpyrrolidone (NMP) as a solvent to make a slurry, and the slurry was applied on aluminum foil and vacuum dried at 90° C. to obtain a positive electrode sheet; then a button half-cell was assembled (where the lithium salt of the electrolyte is 1 mol/L of LiPF6, the solvent is a mixture of ethylene carbonate (EC) and ethyl methyl carbonate (EMC) in a volume ratio of 1:1); and the obtained battery was subjected to a charge-discharge test under the condition of 25±2° C., with a charge-discharge voltage range of 3.7-3.5 V and a current of 0.1 C, and the test data was recorded. The test results are set forth in Table 3.

atmosphere can effectively reduce the magnetic substance in the product and improve the compaction performance of the product. Under the same condition, the more carbon dioxide content in the sintering atmosphere brings out further improved compaction performance and first discharge capacity of the prepared lithium iron phosphate material as the product, thus illustrating the importance and flexibility of carbon dioxide in system regulation. Electrochemical characterization shows that the structural change of lithium iron phosphate led to the improvement of electrochemical properties.

The XRD test result of lithium iron phosphate in Example 2 (see FIG. 1) shows that only a small amount of $Fe_xP$ in the lithium iron phosphate by sintering is obtained in a carbon dioxide atmosphere, and the obtained lithium iron phosphate crystal has further improved crystallinity as compared with that of Example 1, which proves that high temperature is conducive to the improvement of the crystallinity of lithium iron phosphate and can improve its compaction density.

It can be seen from the comparison between Example 1 and Example 7 that if the flow rate is too slow, the protective atmosphere cannot play a protective role, resulting in the increase of magnetic substances in the reaction system, the decline in electrochemical properties, and a slight decline in the compaction performance of the product. Possibly, since the reduction of carbon dioxide leads to a (relative) increase in the carbon monoxide content and associated inhibition of the carbon reduction performance, whereby the carbonization of the system is intensified, and the compaction performance is thus degraded.

From the comparison between Example 1 and Comparative Example 1, it can be seen that in Comparative Example 1 where the sintering was performed at a temperature of 750° C. in a nitrogen atmosphere, only a small amount of $Fe_3P$ is formed, but the compaction density is low and cannot meet the requirement.

From the comparison between Example 1 and Comparative Example 2, it can be seen that when the strong oxidizing gas oxygen is introduced, the carbothermic reduction reaction was difficult to proceed, and the obtained products were mainly ferric phosphate and complex compounds of ferric oxide and lithium, which are not $LiFePO_4$, the product in need. Therefore, it is not suitable to use an atmosphere with excessively strong oxidizing capacity for the carbothermic reduction atmosphere.

TABLE 3

| | Temperature (° C.)/Gas volume ratio ($CO_2:N_2$) | Iron phosphide content (mg/kg) | Compaction density (g/cm³) | First discharge capacity at 0.1 C (mAh/g) | 500-cycle conservation rate (%) |
|---|---|---|---|---|---|
| Example 1 | 800/5:5 | 1.2 | 2.36 | 150.3 | 93.4 |
| Example 2 | 850/5:5 | 2.3 | 2.44 | 154.2 | 94.5 |
| Example 3 | 800/1:9 | 3.6 | 2.29 | 148.4 | 92.1 |
| Example 4 | 800/9:1 | 0.1 | 2.42 | 159.8 | 96.5 |
| Example 5 | 850/1:9 | 12.5 | 2.37 | 135.3 | 89.2 |
| Example 6 | 850/9:1 | 0.9 | 2.47 | 157.3 | 97.6 |
| Example 7 | 800/2:2 | 1.4 | 2.31 | 148.3 | 92.5 |
| Example 8 | 850/5:5 | 0.7 | 2.52 | 145.6 | 98.3 |
| Comparative Example 1 | 750/0:10 | 1.9 | 2.26 | 155.3 | 92.5 |
| Comparative Example 2 | 800/5 Air:5$N_2$ | / | 1.99 | 120.64 | 56.8 |
| Comparative Example 3 | 850/0:10 | 14.8 | 2.33 | 133.4 | 88.7 |

From comparison between Example 1, Example 3 and Example 4, and Example 2, Example 5, Example 6 and Example 8, it can be seen that during the carbothermic reduction of lithium iron phosphate, addition of an appropriate amount of carbon dioxide to form a mild oxidizing From the comparison between Example 1 and Comparative Example 3, it can be seen that sintering without addition of carbon dioxide causes production of a large amount of $Fe_3P$, which is a ferromagnetic substance with a Curie temperature up to 1043 K, and more $Fe_3P$ that is not successfully separated exists between the grains of lithium iron phosphate, leading to decreased compaction density of lithium iron phosphate and decreased capacity. Additionally, magnetic foreign substances that can be dissolved exist, which brings hidden danger to the battery cycle and safety.

The applicant declares that the present application illustrates the detailed process equipment and process flow of the present application through the examples described above, but the present application is not limited to the detailed process equipment and process flow described above. That is, it does not mean that the present application must be implemented by the detailed process equipment and process flow described above. Those skilled in the art should understand that any improvement to the present application, the equivalent replacement of each raw material of the product of the present application, the addition of auxiliary components, the selection of specific methods, and the like all fall within the scope of protection and disclosure of the present application.

The invention claimed is:

1. A preparation method of lithium iron phosphate, comprising:
   sintering a dry material containing an iron source, a lithium source, a phosphorus source, and a reducing carbon source to obtain the lithium iron phosphate, wherein
   a sintering atmosphere comprises a mild oxidizing gas, the mild oxidizing gas comprises carbon dioxide and a protective gas, wherein the protective gas comprises at least one of nitrogen, argon, helium, and neon, a total gas flow rate in the sintering atmosphere is 3 L/min to 6 L/min, and a sintering temperature is 800° C. to 900° C.

2. The preparation method according to claim 1, wherein a volume ratio of the carbon dioxide to the protective gas is (1:99) to (99:1).

3. The preparation method according to claim 1, wherein a temperature holding time for the sintering is 2 h to 20 h.

4. The preparation method according to claim 1, wherein the method comprises at least one of following technical features a to d:
   a. the iron source comprises at least one of ferric phosphate, metallic iron, ferric nitrate, ferric oxide, ferric chloride, and ferrous oxalate;
   b. the phosphorus source comprises at least one of ferric phosphate, ammonium hydrogen phosphate, ammonium dihydrogen phosphate, ammonium phosphate, and ferrous hydrogen phosphate;
   c. the reducing carbon source comprises at least one of sucrose, glucose, and polyethylene glycol; and
   d. the lithium source is at least one of lithium carbonate, lithium phosphate, lithium hydroxide, and lithium chloride.

5. The preparation method according to claim 1, wherein a mass ratio of the iron source, the lithium source, the phosphorus source, and the carbon source is (95-105):(90-110):(95-105):(0.1-10).

6. The preparation method according to claim 1, wherein a preparation process of the dry material comprises:
   mixing the phosphorus source, the iron source, the lithium source, the reducing carbon source, and a solvent and milling a mixture to obtain a slurry, and drying the slurry to obtain a dry material.

7. The preparation method according to claim 6, wherein the method further comprises at least one of following technical features a to g:
   a. a method of the mixing and the milling comprises any one of ball milling and sand milling;
   b. a median diameter D50 of solid particles in the slurry is 0.1 μm to 3 μm;
   c. the solvent comprises at least one of water and ethylene glycol;
   d. a solid content in the slurry is 5% to 80% of a total mass of the slurry;
   e. a method of the drying comprises any one of spray drying and evaporation drying;
   f. a drying temperature is 50° C. to 500° C.; and
   g. a drying time is 0.1 h to 10 h.

8. A lithium iron phosphate material, wherein the lithium iron phosphate material is prepared by the method according to claim 1.

9. The lithium iron phosphate material according to claim 8, wherein the lithium iron phosphate material comprises at least one of following technical features a to d:
   a. the lithium iron phosphate is in an olivine structure;
   b. a compaction density of powder of the lithium iron phosphate material is 2.1 $g/cm^3$ to 3.3 $g/cm^3$;
   c. the lithium iron phosphate material has an average particle size of 0.1 μm to 5 μm; and
   d. the lithium iron phosphate has a specific surface area of 1 $m^2/g$ to 50 $m^2/g$.

10. A lithium-ion battery, comprising a positive electrode sheet, an negative electrode sheet, and a separator disposed between the positive electrode sheet and the negative electrode sheet, wherein the positive electrode sheet comprises lithium iron phosphate prepared by the preparation method according to claim 1.

* * * * *